United States Patent
Gondek (10) Patent No.: US 7,474,438 B2
(45) Date of Patent: Jan. 6, 2009

(54) WIDE GAMUT MAPPING METHOD AND APPARATUS

(75) Inventor: Jay S Gondek, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1102 days.

(21) Appl. No.: 10/632,858

(22) Filed: Jul. 31, 2003

(65) Prior Publication Data

US 2005/0024652 A1 Feb. 3, 2005

(51) Int. Cl.
G06K 15/02 (2006.01)
H04N 1/54 (2006.01)
H04N 1/56 (2006.01)
H04N 1/60 (2006.01)
G09G 5/02 (2006.01)

(52) U.S. Cl. ............... 358/1.9; 358/1.6; 358/501; 358/520; 358/525; 358/523; 358/518; 382/162; 382/167; 345/590; 345/591; 345/601; 345/602; 345/603; 345/604; 345/606; 345/610

(58) Field of Classification Search ............... 358/1.9, 358/1.6, 501, 520, 525, 523, 518; 345/590, 345/591, 601–604, 606, 610; 382/162, 167
See application file for complete search history.

(56) References Cited

U.S. PATENT DOCUMENTS

| | | | | |
|---|---|---|---|---|
| 5,416,890 A | * | 5/1995 | Beretta | 345/590 |
| 5,892,891 A | * | 4/1999 | Dalal et al. | 358/1.9 |
| 5,982,924 A | * | 11/1999 | Power et al. | 382/162 |
| 6,310,696 B1 | * | 10/2001 | Kumada | 358/1.9 |
| 6,373,595 B1 | * | 4/2002 | Semba et al. | 358/1.9 |
| 6,388,674 B1 | * | 5/2002 | Ito et al. | 345/590 |
| 6,421,142 B1 | * | 7/2002 | Lin et al. | 358/1.9 |
| 6,437,792 B1 | * | 8/2002 | Ito et al. | 345/600 |
| 6,724,507 B1 | * | 4/2004 | Ikegami et al. | 358/518 |
| 6,765,586 B2 | * | 7/2004 | Yamazaki et al. | 345/590 |
| 7,064,864 B2 | * | 6/2006 | Takahashi et al. | 358/1.9 |
| 7,177,465 B1 | * | 2/2007 | Takahira | 382/166 |

(Continued)

FOREIGN PATENT DOCUMENTS

EP 0961488 12/1999

(Continued)

OTHER PUBLICATIONS

European Search Report dated May 9, 2006.

*Primary Examiner*—David K Moore
*Assistant Examiner*—Beniyam Menberu (57) ABSTRACT

A method and apparatus is used for gamut mapping to a printer gamut that includes receiving a narrow gamut, a wide gamut, a printer gamut for printing on a printer and a predetermined mapping between the narrow and printer gamuts, identifying overlapping areas in the wide gamut, the narrow and printer gamuts, determining when the narrow gamut overlaps areas of the wide gamut, utilizing the narrow gamut values when the determination provides overlapping areas of the narrow gamut and the wide gamuts, selecting a wide gamut interpolation point corresponding to the surface of the printer gamut when narrow gamut areas do not overlap the wide gamut according to the determination, selecting a narrow gamut interpolation point by mapping the narrow gamut to the printer gamut and interpolating the narrow gamut interpolation point and the wide gamut interpolation point expanding the narrow gamut values into the printer gamut.

20 Claims, 7 Drawing Sheets

U.S. PATENT DOCUMENTS

| | | | |
|---|---|---|---|
| 7,233,694 B2 * | 6/2007 | Fukui | 382/162 |
| 2002/0149786 A1 * | 10/2002 | Hudson et al. | 358/1.9 |
| 2002/0159081 A1 * | 10/2002 | Zeng | 358/1.9 |
| 2003/0001860 A1 | 1/2003 | Yamazaki et al. | |
| 2003/0072015 A1 * | 4/2003 | Fujino | 358/1.9 |
| 2004/0096104 A1 * | 5/2004 | Terekhov | 382/167 |
| 2004/0100643 A1 * | 5/2004 | Jones et al. | 358/1.9 |
| 2004/0136014 A1 * | 7/2004 | Maltz | 358/1.9 |
| 2004/0212814 A1 * | 10/2004 | Ishigami | 358/1.9 |
| 2005/0141848 A1 * | 6/2005 | Deguchi et al. | 386/1 |

FOREIGN PATENT DOCUMENTS

| | | |
|---|---|---|
| EP | 1006483 | 6/2000 |
| JP | 2002185804 A | 6/2002 |
| JP | 2003060925 A | 2/2003 |
| JP | 2003-153027 | 5/2003 |
| JP | 2003153020 A | 5/2003 |

\* cited by examiner

WIDE GAMUT MAPPING METHOD AND APPARATUS

BACKGROUND

The present invention relates to color gamut mapping different size color gamuts for printing.

The term "color gamut" or gamut generally is used to describe the complete range of colors an image contains or a device is able to render. It is sometimes referred to as a color gamut or the gamut color space associated with a printer or screen display device. Gamut mapping an image onto a screen or printer generally requires adjusting the colors of the image to fit in the constrained color gamut of the screen or printer. In some cases, the image being displayed does not have a wide range of colors and therefore does not fill or utilize the wider range of colors in the printer gamut or even the screen gamut. In other cases, the colors in an image are outside the narrow color gamut of a displaying device but can be printed on a color printer having a wider gamut.

These wider gamut color printers have grown in popularity as consumers desire to achieve professional or at least "pro-sumer" quality color printing. Newer applications are being created that send wider gamut images directly to these wider gamut printers and other output devices. The peer-to-peer color workflow used in these applications is advantageous as the wider printer gamuts are not limited by the intermediary and narrower gamut of a monitor or other display device. For example, cameras, palm tops, cell phones, Internet terminals and digital picture frames generate images using wider gamuts in YCC, Adobe RGB, bgRGB, scRGB, CIELAB, e-sRGB or ROMM digital representations. These devices are imaging enabled and connected to a printer directly or through a network or Internet connection and do not need to display images using a narrow gamut like sRGB.

Nonetheless, there does remain many legacy systems and applications that continue to use a workflow that transmits colors using the narrower (sRGB) and then gamut maps to the wider color gamut of a color printer. Even new systems and applications work in the more display-centric workflow using the sRGB gamut as the sRGB color space has become an industry standard in color transmission. In general, the sRGB narrow gamut will continue to serve the consumer market as it is inexpensive to implement, computationally efficient, and transparent to the end user. Printing with both sRGB, a relatively narrow gamut, and wider gamuts will likely coexist for the future as consumers very slowly migrate to wider gamut technologies.

Unfortunately, the coexistence of narrow and wide gamut technologies makes it difficult to print color images consistently on wide gamut printers. This is due to differences in gamut mapping from the newer wider gamut and the narrower sRGB technologies. Gamut mapping from a wider gamut to the printer gamut produces different results than gamut mapping from the sRGB used on a display to the same printer gamut.

In the first instance, a wide gamut application performs processing on the wide gamut information and then outputs the image data to the printer by gamut mapping between the wide gamut and the printer gamut; narrow gamut sRGB applications process narrow gamut information but instead perform gamut mapping from the narrow gamut to the printer gamut. The printed output differs on conventional systems due to the different types of gamut mapping and transformations performed. For example, conventional systems using sRGB cannot accurately represent the numerous dark chromatic colors as they are outside the narrow gamut space of sRGB.

There remains a need to be able to print color images consistently whether gamut mapping from a narrow gamut like sRGB or a wider gamut to the gamut of a printer.

BRIEF DESCRIPTION OF THE DRAWINGS

Like reference numbers and designations in the various drawings indicate like elements.

SUMMARY OF THE INVENTION

One aspect of the present invention features a method of gamut mapping to a printer gamut. The gamut mapping includes receiving a narrow gamut, a wide gamut and a printer gamut for printing on a printer and a predetermined mapping between the narrow gamut and the printer gamut; identifying overlapping areas in the wide gamut, the narrow gamut and the printer gamut; determining when the narrow gamut overlaps one or more areas of the wide gamut; utilizing the narrow gamut values when the determination provides overlapping areas of the narrow gamut and the wide gamut; selecting a wide gamut interpolation point corresponding to the surface of the printer gamut when narrow gamut areas do not overlap the wide gamut according to the determination; selecting a narrow gamut interpolation point by mapping the narrow gamut to the printer gamut based upon a reference color space; and interpolating the narrow gamut interpolation point and the wide gamut interpolation point to expand the narrow gamut values into the printer gamut.

DETAILED DESCRIPTION

Gamut mapping systems and methods designed in accordance with implementations of the present invention have at least one or more of the following advantages. Recently developed wider gamut spaces are mapped to an entire printer gamut space without adversely affecting the mapping of narrower or smaller gamut spaces to the same printer space. Gamut mapping from a wide gamut space like YCC, Adobe RGB, bgRGB, scRGB, CIELAB, e-sRGB or ROMM to a printer gamut space is supported as well as the narrow gamut space to printer gamut space mapping. Using implementations of the present invention, the dominant workflow based on a sRGB narrow gamut smoothly extends into areas of the printer gamut beyond the narrow gamut range. The gamut mapping for the sRGB narrow gamut coexists with the gamut mapping between the wider gamuts and a target printer gamut.

As a result, applications using narrow gamut technology can print color images on wider gamut printers producing output consistent with applications printing with wider gamut technologies. In one implementation of the present invention, existing sRGB narrow gamut are combined with a wide gamut colormap (e.g., YCC) to extrapolate a consistent gamut mapping in the printer gamut. By combining aspects of the narrow and wide gamuts together, the use of a popular narrow gamut workflow (e.g., sRGB) is preserved without sacrificing image consistency and quality.

Figure 1:
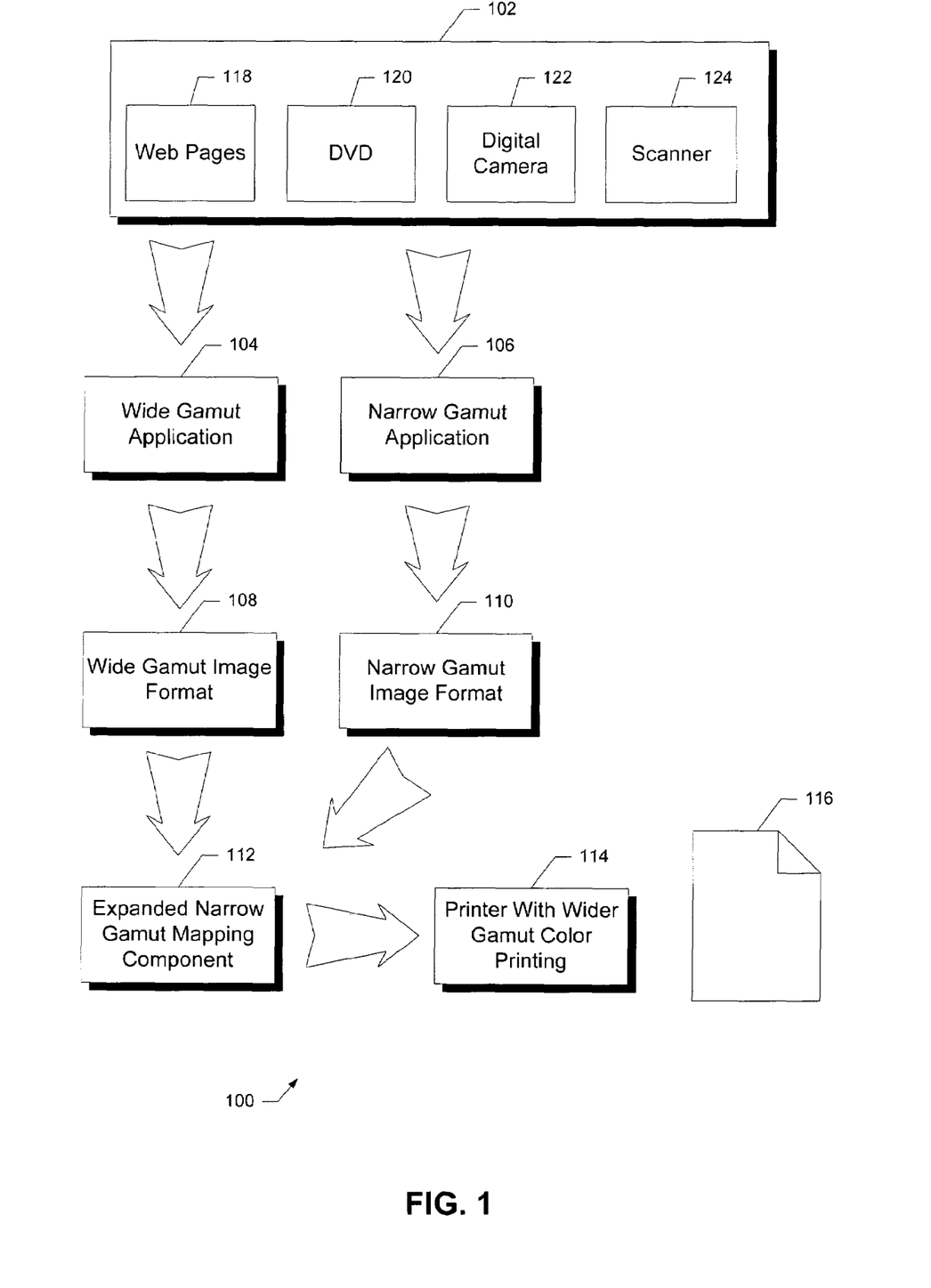
FIG. 1 is a flowchart diagram of the workflow for an application printing on a wide gamut printer in accordance with one implementation of the present invention.

FIG. 1 is a flowchart diagram of the workflow operations for an application printing on a wide gamut printer in accordance with one implementation of the present invention. Workflow 100 includes image sources 102, a wide gamut application 104, a narrow gamut application 106, a wide gamut image format 108, a narrow gamut image format 110, an expanded narrow gamut mapping component 112 and a wider gamut printer 114 that outputs a printed output 116. This example illustrates web pages 118, DVD12O, digital camera 122 and scanner 124 producing high quality images compatible with printing from a wide gamut application 104 or a narrow gamut application 106. For example, a digital camera 122 may capture images represented in a wide gamut like ROMM and print the image with consistent color rendering through wide gamut application 104 or narrow gamut application 106.

In an increasing number of systems, the wide gamut information is communicated directly to printers and other high quality imaging devices in a peer-to-peer type workflow model. This is generally an improvement over more CRT-centric models that limit the image data to the narrow gamut associated with the CRT (e.g., sRGB) rather than the typically larger gamut of the printer.

In practice, however, both wide gamut application 104 and narrow gamut application 106 are used to process the incoming image and generate corresponding wide gamut information for a wider gamut printer. For this reason, workflow 100 supports wide gamut application 104 as a newer gamut color processing format as well as narrow gamut application 106 as the dominant legacy image processing format. Unlike conventional systems, workflow 100 uses implementations of the present invention to generate consistent color printing.

Implementations of the present invention produce consistent printed results by combining the narrow, wide and printer gamuts together in workflow 100. Accordingly, expanded narrow gamut mapping component 112 uses a dominant existing narrow gamut like sRGB in combination with a wide-gamut to more smoothly extend into any printer gamut not already covered by the narrow gamut. The resulting images can be printed with more consistent results on printer with wider gamut color printing 114 producing printed output 116.

Figure 2A:
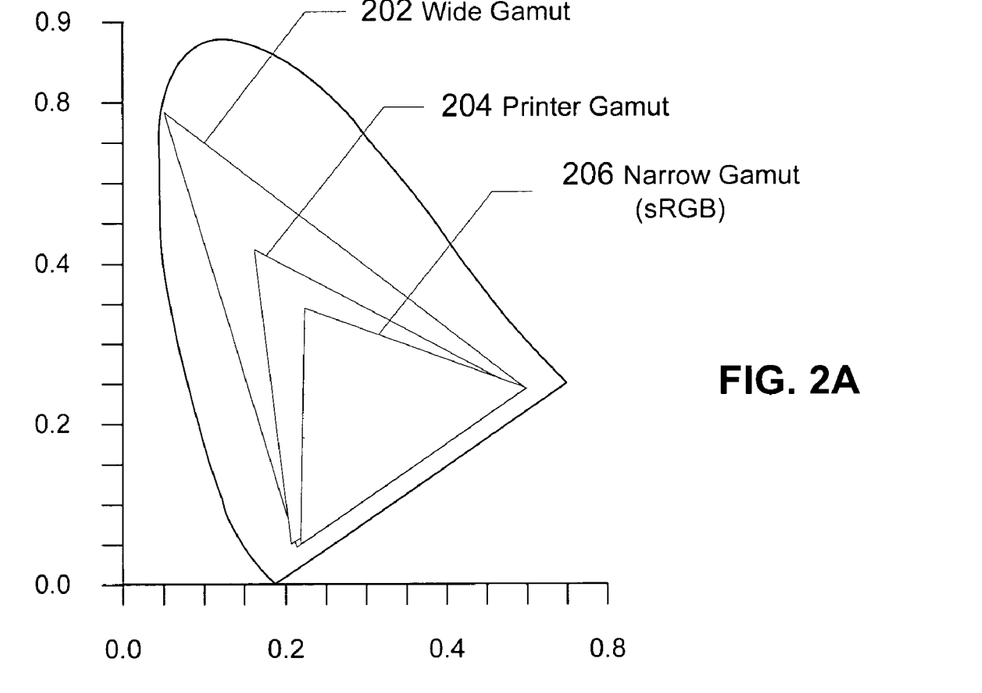
FIGS. 2A and 2B are block diagram representations of a wide gamut, a printer gamut and a narrow gamut in two different color space representations.
Figure 2B:
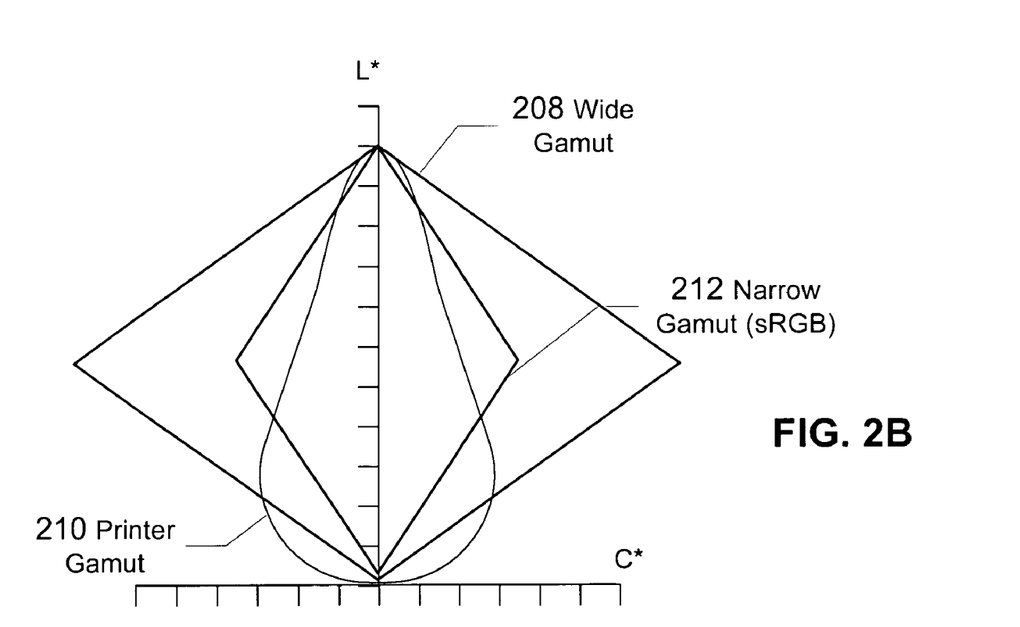

FIGS. 2A and 2B are block diagram representations of a wide gamut, a printer gamut and a narrow gamut in two different representations. FIG. 2A illustrates wide gamut 202, printer gamut 204 and narrow gamut 206 superimposed over a CIELAB color space. This representation of the colors illustrates the growing trend to create printers with a wider printer gamut 204 as well as the relative difference between narrow gamut 206 and wider gamut 202. FIG. 2B instead illustrates wide gamut 208, printer gamut 210 and narrow gamut (sRGB) 212 in a CIE LCH (Luminosity, Chroma and Hue) color space framework. Color gamut in CIELAB color space can be transformed into CIE LCH color space using transforms well known in the art. This latter illustration not only shows the relative difference in gamut but also the variation in shape of the respective gamut. As will be described later herein, implementations of the present invention combine these gamut sizes and shapes together (i.e., narrow gamut and wide gamut) to perform color gamut mapping and print consistent color images.

Figure 3A:
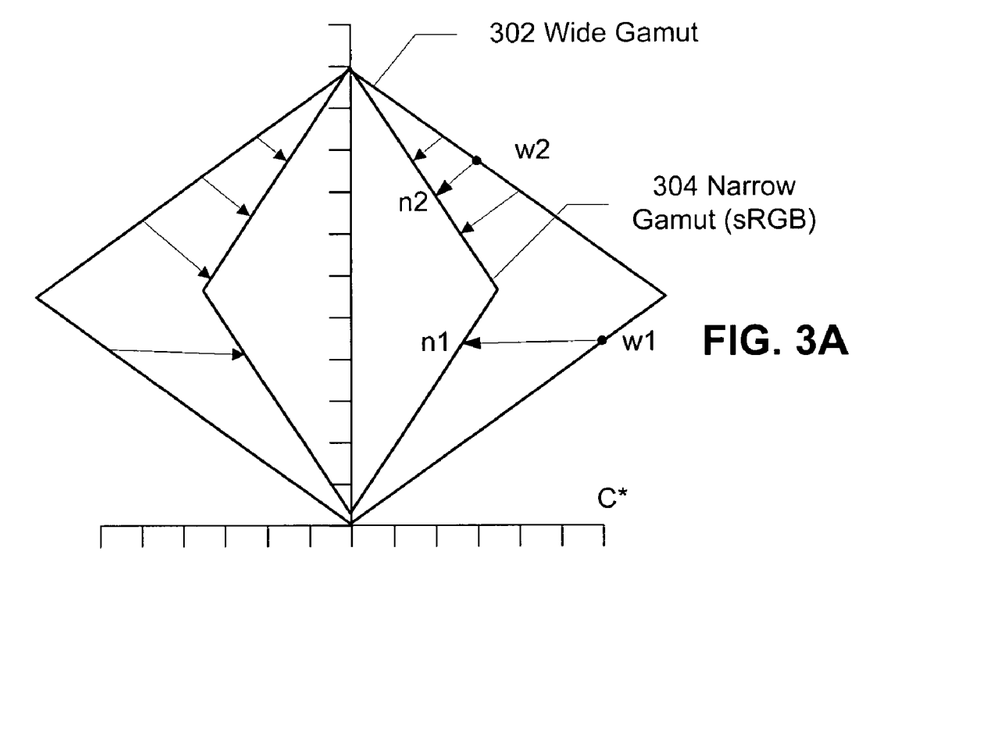
FIG. 3A, 3B, 3C, 3D, 3E are used to visualize the color gamut mapping operation in accordance with one implementation of the present invention.

FIG. 3A through FIG. 3E are used to visualize the color gamut mapping operation in accordance with one implementation of the present invention. Operations associated with the gamut mapping illustrated in these diagrams also correspond to subsequent flowchart diagrams. In FIG. 3A, a wide gamut 302 is superimposed over a narrow gamut 304 and the LCH color space. Using this color space information, the surface of the wide gamut is clipped to the surface of the narrow gamut as illustrated. For purposes of explanation, point w1 and w2 on the surface of wide gamut 302 are clipped and mapped to points n1 and n2 respectively on the surface of narrow gamut 304.

Figure 3B:
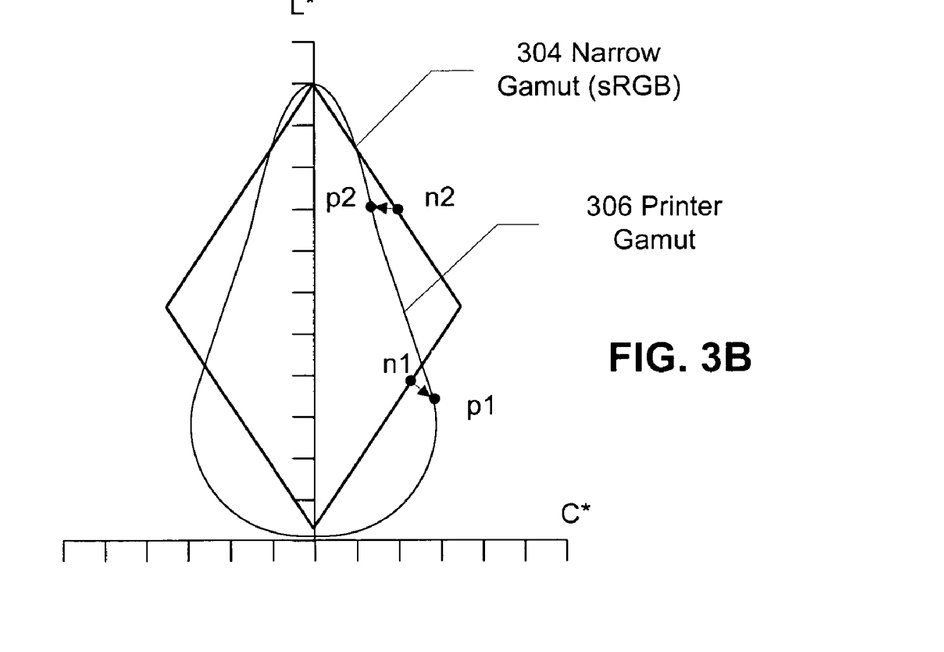

Next, in FIG. 3B a printer gamut 306 is superimposed over narrow gamut 304 and the surface of points resulting from the previous clipping and mapping operation. In this example, the points in this resulting surface are then translated to the corresponding values in printer gamut 306 according to a reference color space like CIELAB or LCH. The resulting translation creates a relationship between points like n1 and n2 on the surface of narrow gamut 304 and points p1 and p2 within printer gamut 306. Points p1, p2 and many other points create a surface and a set of narrow gamut interpolation points to be referenced and used subsequently in conjunction with narrow gamut 304.

Figure 3C:
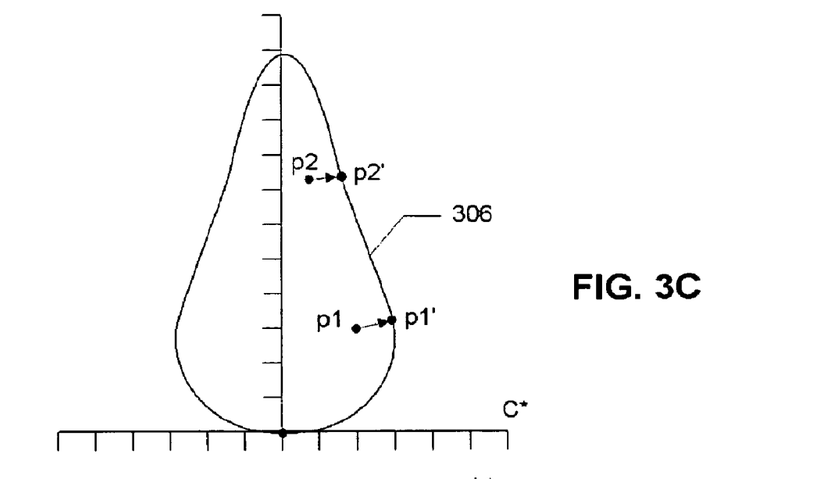

FIG. 3C is an illustration of narrow gamut interpolation points p1 and p2 wide gamut interpolation points p1' and p2' along with the resulting surface. In the implementation illustrated, the chroma of narrow gamut interpolation points p1, p2 and other points on the surface are generally increased until they are on the surface of printer gamut 306. The p1', p2' and other points on the resulting surface are considered the wide gamut interpolation points and are also used to interpolate values in color space outside the narrow gamut.

Figure 3D:
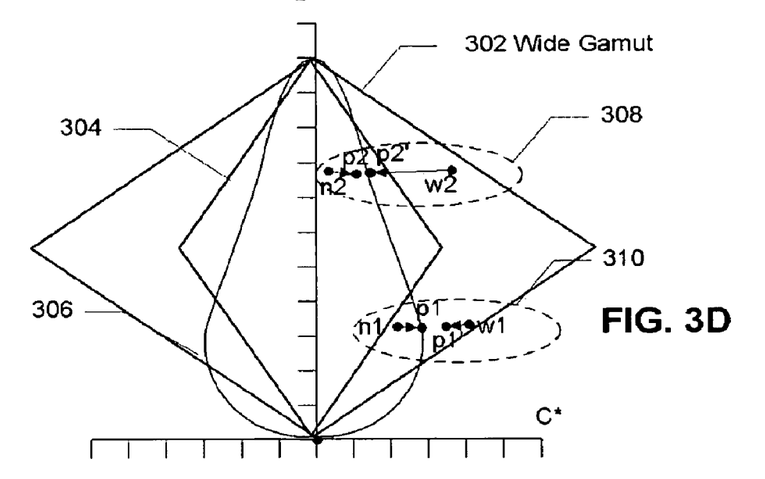

FIG. 3D is a composite illustration of the narrow, wide and printer gamut along with representative points corresponding to the operations of the present invention. The interpolation points resulting from these operations are used to perform gamut mapping when the color values are not in the narrow gamut. Color values that fall in the narrow gamut range (i.e., the sRGB color space) are presented by using them directly and without modification.

Figure 3E:
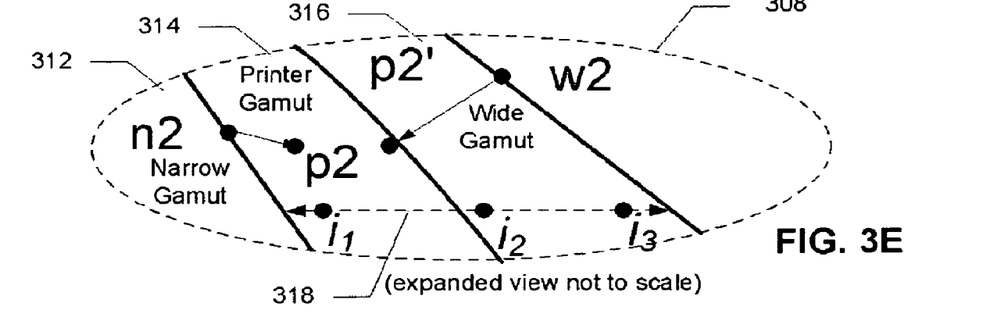

To further clarify this relationship, FIG. 3E provides a zoomed in view (not-to-scale) illustrating the interpolation points used to interpolate values lying somewhere between the narrow gamut and wide gamut. As previously mentioned, p2 is one narrow gamut interpolation point and p2' is one wide gamut interpolation point used in accordance with gamut mapping of the present invention. Colors within the narrow gamut are preserved and used while colors outside the narrow gamut are obtained by interpolating between the narrow and wide gamut interpolation points. For example, in FIG. 3E a color falling at position i2 would be analyzed by linear interpolation of the respective interpolation points. Specifically, i2 would be calculated as approximately ½(p2+p2'); other points outside the narrow gamut would be calculated similarly based on the position of using points in set of interpolation points 318.

Figure 4:
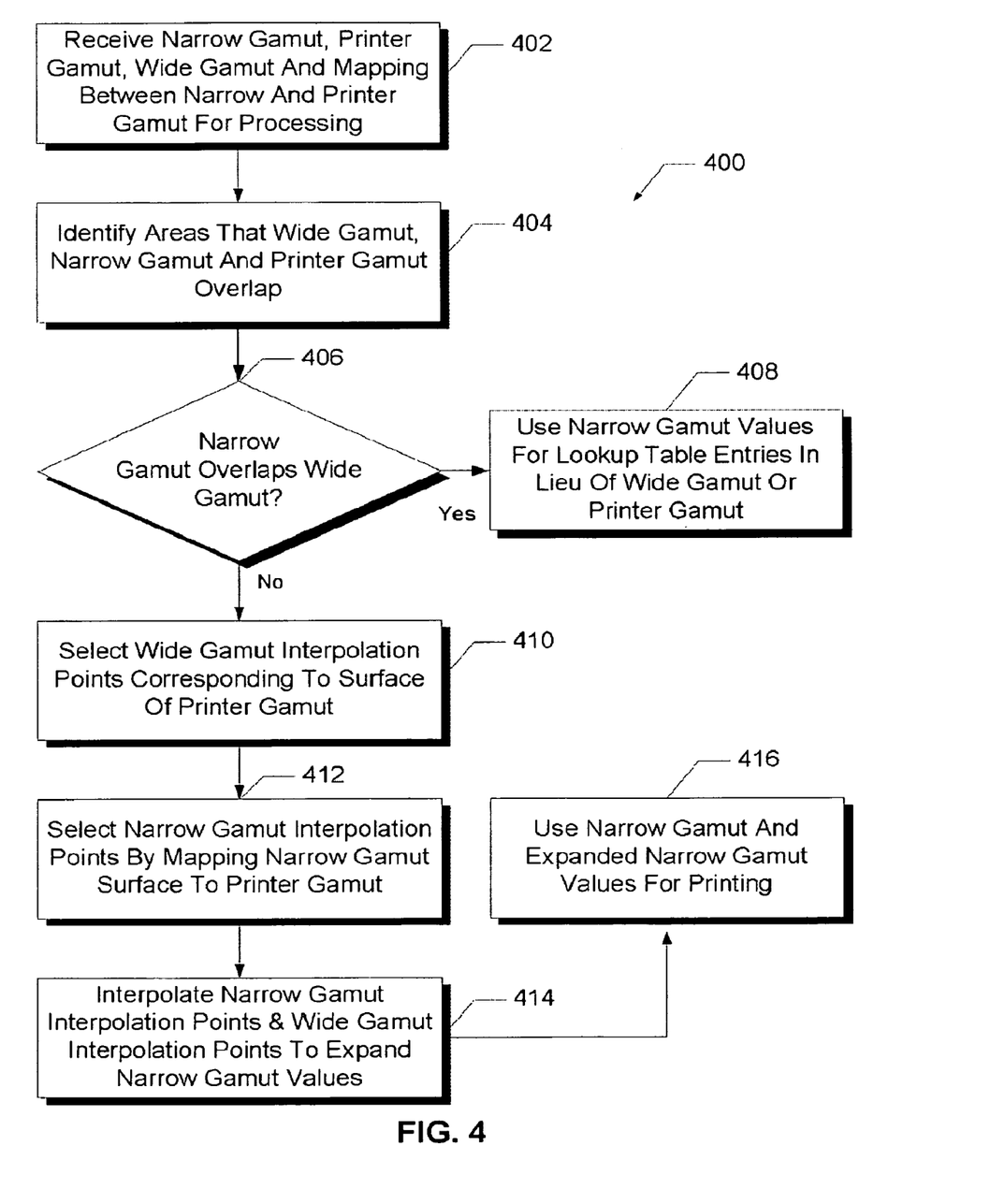
FIG. 4 is a flowchart diagram of the operations for gamut mapping using narrow interpolation points and wide interpolation points in accordance with one implementation of the present invention.

FIG. 4 is a flowchart diagram of the operations for gamut mapping using narrow interpolation points and wide interpolation points in accordance with one implementation of the present invention (400). Initially, implementations of the present invention receive a narrow gamut (e.g., sRGB), a printer gamut, a wide gamut for processing and a predetermined mapping between the narrow and printer gamuts (402). The areas in a CIELAB or LCH space are compared to determine the one or more areas that the wide gamut narrow gamut and printer gamut overlap (404). When the narrow gamut overlaps the wide gamut (406), the narrow gamut data values are used for lookup table entries in lieu of wide gamut or print gamut values (408). This causes the color values in sRGB space to be used consistently whether printing using a narrow gamut based application or a wide gamut based application. For example, a color image entirely within the narrow gamut or sRGB space would only use the sRGB space and would appear the same whether printed from a wide gamut application or a narrow gamut application.

Once values extend outside the narrow gamut area, values of both the narrow gamut and the wide gamut are used in accordance with the present invention. As previously described, implementations of the present invention select wide gamut interpolation points corresponding to the surface of the printer gamut (410) and narrow gamut interpolation points by mapping points on the narrow gamut surface (412). Details on selecting these interpolation points are described in further detail later herein and in conjunction with FIG. 5.

Once they are selected, the narrow and wide interpolation points are used to linearly interpolate and identity proper corresponding areas in the printer gamut (414). In one implementation, the interpolation maintains the hue of the clipped color while increasing the chroma to the printer surface. Lightness of each resulting color is modified to a fractional difference in lightness between the lightness of the clipped value and the original unclipped value. Together, the color values in the narrow gamut (e.g., sRGB) are used along with color values resulting from interpolation when doing the gamut mapping (416). As previously described, this preserves the narrow gamut information while using the wide gamut to print in the printer gamut color space.

As an alternative to the interpolation described above, another method is used to extrapolate between the narrow gamut and wide gamut when gamut mapping. In this implementation, points on the surface of the wide gamut are also clipped to the surface of the narrow gamut but in CIELAB rather than CIE LCH color space. A difference or delta gamut value is computed as between the wide gamut values and the clipped wide gamut values corresponding to the surface of the narrow gamut. Instead of linear interpolation, the delta gamut value is added to the clipped wide gamut value (on the surface of the narrow gamut) to obtain a goal CIELAB value for the mapped color. This operation uses the relative difference between the different gamuts thereby preserving the narrow gamut information (e.g., sRGB). The goal CIELAB value is then mapped in the printer gamut using one or more different types of gamut clipping as appropriate. Many other combinations of clipping and extrapolating are contemplated to preserve the narrow gamut information and perform gamut mapping in the printer gamut color space.

Figure 5:
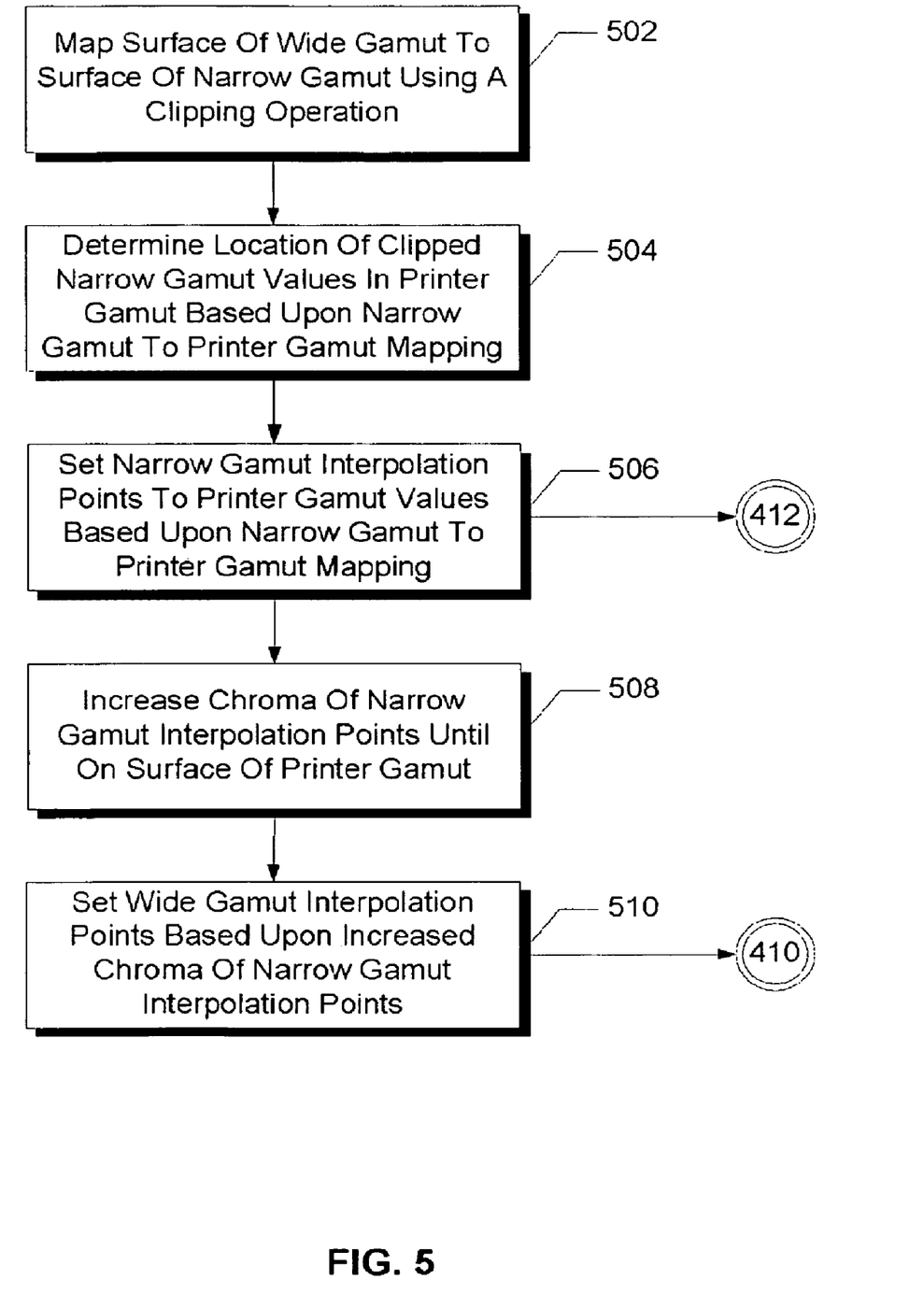
FIG. 5 is a flowchart diagram providing further detailed operations for identifying both narrow interpolation points and wide interpolation points in accordance with one implementation of the present invention.

FIG. 5 is a flowchart diagram providing further details for identifying both narrow interpolation points and wide interpolation points in accordance with one implementation of the present invention. In this example, points on the surface of the wide gamut are mapped to corresponding points on the surface of narrow gamut using a clipping operation (502). In one implementation of clipping, the narrow gamut sRGB having independent RGB colors with an RGB range of (0 . . . 255, 0 . . . 255,0 . . . 255) is clipped by rounding each independent color channel to the nearest 0 or 255 values when the input RGB values from the wide gamut are out of range. Other than independently clipping each color channel, alternate implementations of clipping may operate to preserve a constant hue or clip a gamut intersection toward a gamut centroid, for example.

The location of the clipped narrow gamut values in the printer gamut are then determined by way of narrow gamut to printer gamut mapping information (504). Predetermined gamut mapping information for this transformation locates and maps the narrow gamut surface of points to corresponding points in the printer gamut. The narrow gamut interpolation points are set to the resulting printer gamut values from this narrow gamut to printer gamut mapping (506). This portion of the results is used back in FIG. 4 at step 412 where the narrow gamut interpolation points are identified.

Further processing is needed to obtain the wide gamut interpolation points. In one implementation of the present invention, processing continues and the chroma of the narrow gamut interpolation points are increased until the points are on the printer gamut surface (508). The wide interpolation points are set to these points along the printer surfaced based upon increasing the chroma values of the narrow interpolation points (510). These resulting values are also used in FIG. 4 at step 410 to identify the wide gamut interpolation points.

Figure 6:
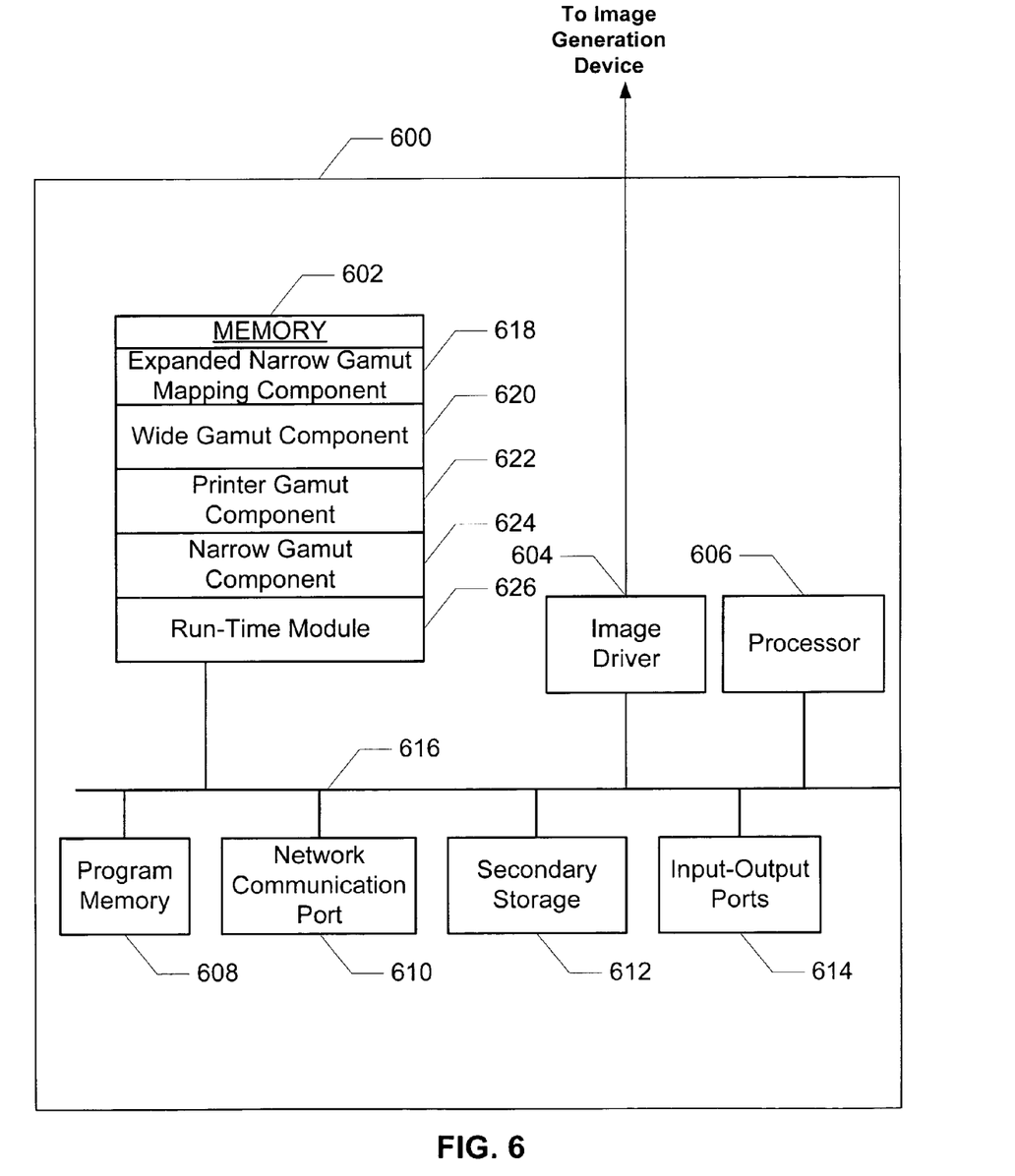
FIG. 6 is a block diagram of a system used in one implementation of the present invention for performing the apparatus or methods of the present invention.

FIG. 6 is a block diagram of a system 600 used in one implementation for performing methods or implementing an apparatus of the present invention. System 600 includes a memory 602 to hold executing programs typically random access memory (RAM) or read-only memory (ROM) such as a flash ROM, an image driver 604 capable of interfacing and driving a display or output device, a processor 606, a program memory 608 for holding drivers or other frequently used programs, a network communication port 610 for data communication, a secondary storage 612 with secondary storage controller, and input/output (I/O) ports 614 also with I/O controller operatively coupled together over a bus 616. In general, system 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs). In one implementation, memory 602 includes an expanded narrow gamut mapping component 618, a wide gamut component 620, a printer gamut component 622, a narrow gamut component 624, and a run-time module 626 that manages system resources used when processing one or more of the above components on system 600.

Expanded narrow gamut mapping component 618 is designed to identify interpolation points for both the narrow gamut component 624 and wide gamut component 620 and interpolate these points in accordance with the present invention. Instead of using wide gamut component 620 or printer gamut component 622 directly, narrow gamut component 624 entries are used for gamut mapping except when the values are outside the narrow gamut range. Points in printer gamut component 622 are identified for printing by interpolating between the narrow gamut and the wide gamut. For example, this preserves the narrow gamut information when using the popular sRGB narrow gamut while providing a smooth transition to the wider printer gamuts. The result is more consistent printed color output while exploiting the higher quality print available on newer wider gamut color printers.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of gamut mapping to a printer gamut, comprising:
   receiving a narrow gamut, a wide gamut, a printer gamut for printing on a printer and a predetermined mapping between the narrow and the printer gamuts;
   identifying overlapping areas in the wide gamut, the narrow gamut and the printer gamut;
   determining when the narrow gamut overlaps one or more areas of the wide gamut;
   utilizing the narrow gamut values when the determination provides overlapping areas of the narrow gamut and the wide gamut;
   selecting a wide gamut interpolation point corresponding to the surface of the printer gamut when narrow gamut areas do not overlap the wide gamut according to the determination;
   selecting a narrow gamut interpolation point that includes mapping the narrow gamut to the printer gamut based upon the predetermined mapping when narrow gamut areas do not overlap the wide gamut according to the determination, mapping the surface of the wide gamut to the surface of the narrow gamut using a clipping operation, determining location of clipped narrow gamut values in printer gamut as mapped through the predetermined narrow to printer gamut mapping, and setting the narrow gamut interpolation points based upon values mapped to the printer gamut; and
   interpolating the narrow gamut interpolation point and the wide gamut interpolation point to expand the narrow gamut values into the printer gamut.

2. The method of claim 1 wherein a portion of the wide gamut is wider than the printer gamut and a portion of the printer gamut is wider than the narrow gamut.

3. The method of claim 1 wherein the wide gamut is selected from a set of wide gamuts including: CIELAB, YCC, Adobe RGB, bgRGB, scRGB, e-sRGB and ROMM.

4. The method of claim 1 wherein the narrow gamut includes an sRGB compatible gamut.

5. The method of claim 1 wherein identifying overlapping areas further includes, mapping the area covered by the narrow gamut, the wide gamut and the printer gamut in a reference color space selected from a set including CIELAB color space and LCH color space.

6. The method of claim 1 wherein selecting the wide gamut interpolation point includes:
   mapping the surface of the wide gamut to the surface of the narrow gamut using a clipping operation;
   determining location of clipped narrow gamut values in a printer gamut as mapped through the predetermined the narrow to printer gamut mapping;
   increasing chroma of the clipped narrow gamut values mapped to the printer gamut until they are on the surface of printer gamut;
   and setting the wide gamut interpolation points based upon values on the surface of the printer gamut.

7. The method of claim 6 wherein the clipping operation is selected from a set of clipping operations including:
   independently clipping each color channel, preserving a constant hue during clipping and clipping with a gamut intersection toward the gamut centroid.

8. The method of claim 6 wherein the map between the clipped wide-gamut surface values and the printer gamut maintains the hue of the clipped color while increasing chroma to the printer gamut surface.

9. The method of claim 8 wherein the map between the clipped wide-gamut surface values and the printer gamut further modifies the lightness of the colors proportional to the difference between the lightness of the narrow gamut and the clipped values.

10. A printing apparatus for gamut mapping into a printer gamut, comprising:
   a processor capable of executing instructions for gamut mapping;
   a memory containing instructions when executed on the processor causes the processor to, receive a narrow gamut, a wide gamut, a printer gamut for printing on a printer and a predetermined mapping between the narrow and printer gamuts, identify overlapping areas in the wide gamut, the narrow gamut and the printer gamut, determine when the narrow gamut overlaps one or more areas of the wide gamut, utilize the narrow gamut values when the determination provides overlapping areas of the narrow gamut and the wide gamut, select a wide gamut interpolation point corresponding to the surface of the printer gamut when narrow gamut areas do not overlap the wide gamut according to the determination, select a narrow gamut interpolation point by mapping the narrow gamut to the printer gamut based upon the predetermined mapping between the narrow and printer gamuts when narrow gamut areas do not overlap the wide gamut according to the determination, by mapping the surface of the wide gamut to the surface of the narrow gamut using a clipping operation, by determining the location of clipped narrow gamut values in printer gamut as mapped through a reference color space and by setting the narrow gamut interpolation points based upon values manned to in the printer gamut, and interpolate the narrow gamut interpolation point and the wide gamut interpolation point to expand the narrow gamut values into the printer gamut.

11. The apparatus of claim 10 wherein a portion of the wide gamut is wider than the printer gamut and a portion of the printer gamut is wider than the narrow gamut.

12. The apparatus of claim 10 wherein the wide gamut is selected from a set of wide gamuts including:
CIELAB, YCC, Adobe RGB, bgRGB, scRGB, e-sRGB and ROMM.

13. The apparatus of claim 10 wherein the narrow gamut includes an sRGB compatible gamut.

14. The apparatus of claim 10 wherein the instructions that identify overlapping areas further includes instructions that map the area covered by the narrow gamut, the wide gamut and the printer gamut in a reference color space selected from a set including CIELAB color space and LCH color space.

15. The apparatus of claim 10 wherein instructions that select the wide gamut interpolation point further include instructions that:
map the surface of the wide gamut to the surface of the narrow gamut using a clipping operation, determine the location of clipped narrow gamut values in a printer gamut as mapped through the predetermined narrow to printer gamut mapping, increase the chroma of the clipped narrow gamut values mapped to the printer gamut until they are on the surface of printer gamut and set the wide gamut interpolation points based upon values on the surface of the printer gamut.

16. The apparatus of claim 15 wherein the instructions for clipping are selected from a set of clipping instructions including:
instructions that independently clip each color channel, instructions that preserve a constant hue during clipping and instructions that clip with a gamut intersection toward the gamut centroid.

17. The apparatus of claim 15 wherein the instructions that map between the narrow gamut and the printer gamut maintain the hue of the clipped color while increasing chroma to the printer gamut surface.

18. The apparatus of claim 17 wherein the instructions that map between the narrow gamut and the printer gamut further modify the lightness of the colors proportional to the difference between the lightness of the narrow gamut and the clipped values.

19. An apparatus for gamut mapping to a printer gamut, comprising:
means for receiving a narrow gamut, a wide gamut, a printer gamut for printing on a printer and a predetermined mapping between the narrow and printer gamuts;
means for identifying overlapping areas in the wide gamut, the narrow gamut and the printer gamut; means for determining when the narrow gamut overlaps one or more areas of the wide gamut;
means for utilizing the narrow gamut values when the determination provides overlapping areas of the narrow gamut and the wide gamut;
means for selecting a wide gamut interpolation point corresponding to the surface of the printer gamut when narrow gamut areas do not overlap the wide gamut according to the determination;
means for selecting a narrow gamut interpolation point that includes mapping the narrow gamut to the printer gamut based upon the predetermined mapping between the narrow and printer gamuts when narrow gamut areas do not overlap the wide gamut according to the determination, mapping the surface of the wide gamut to the surface of the narrow gamut using a clipping operation, determining the location of clipped narrow gamut values in printer gamut as mapped through a reference color space and setting the narrow gamut interpolation points based upon values mapped to in the printer gamut; and
means for interpolating the narrow gamut interpolation point and the wide gamut interpolation point to expand the narrow gamut values into the printer gamut.

20. A storage device storing a computer program for gamut mapping to a printer gamut, comprising instructions operable to cause a programmable processor to:
receive a narrow gamut, a wide gamut, a printer gamut for printing on a printer and a predetermined mapping between the narrow and printer gamuts; identify overlapping areas in the wide gamut, the narrow gamut and the printer gamut;
determine when the narrow gamut overlaps one or more areas of the wide gamut;
utilize the narrow gamut values when the determination provides overlapping areas of the narrow gamut and the wide gamut;
select a wide gamut interpolation point corresponding to the surface of the printer gamut when narrow gamut areas do not overlap the wide gamut according to the determination;
select a narrow gamut interpolation point that includes mapping the narrow gamut to the printer gamut based upon the predetermined mapping between the narrow and printer gamuts when narrow gamut areas do not overlap the wide gamut according to the determination, mapping the surface of the wide gamut to the surface of the narrow gamut using a clipping operation, determining the location of clipped narrow gamut values in printer gamut as mapped through a reference color space and setting the narrow gamut interpolation points based upon values mapped to in the printer gamut; and
interpolate the narrow gamut interpolation point and the wide gamut interpolation to expand the narrow gamut values into the printer gamut.

* * * * *

UNITED STATES PATENT AND TRADEMARK OFFICE
CERTIFICATE OF CORRECTION

PATENT NO. : 7,474,438 B2  Page 1 of 1
APPLICATION NO. : 10/632858
DATED : January 6, 2009
INVENTOR(S) : Jay S Gondek It is certified that error appears in the above-identified patent and that said Letters Patent is hereby corrected as shown below:

In column 3, line 9, after "gamut" delete "are" and insert -- is --, therefor.

In column 3, line 23, delete "DVD12O" and insert -- DVD120 --, therefor.

In column 5, line 28, delete "identity" and insert -- identify --, therefor.

In column 9, line 5, in Claim 10, delete "manned" and insert -- mapped --, therefor.

In column 9, line 5, in Claim 10, delete "to in" and insert -- to --, therefor.

In column 10, line 20, in Claim 19, delete "to in" and insert -- to --, therefor.

In column 10, line 52, in Claim 20, delete "to in" and insert -- to --, therefor.

Signed and Sealed this

Nineteenth Day of May, 2009

JOHN DOLL
*Acting Director of the United States Patent and Trademark Office*